United States Patent
Seong et al.

(10) Patent No.: US 6,728,177 B2
(45) Date of Patent: Apr. 27, 2004

(54) METHOD OF RECORDING DATA ON OPTICAL DISC AT HIGH MULTIPLE SPEED AND APPARATUS THEREOF

(75) Inventors: Pyong-yong Seong, Seoul (KR); Kyu-hwan Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 238 days.

(21) Appl. No.: 09/946,814

(22) Filed: Sep. 6, 2001

(65) Prior Publication Data

US 2002/0114232 A1 Aug. 22, 2002

(30) Foreign Application Priority Data

Dec. 14, 2000 (KR) ........................................ 2000-76491

(51) Int. Cl.$^7$ ................................................ G11B 7/00
(52) U.S. Cl. .................... 369/47.4; 369/47.5; 369/53.1; 369/59.1
(58) Field of Search ............................ 369/47.1, 47.15, 369/47.28, 47.4, 47.48, 47.5, 44.53, 53.1, 53.11, 53.37, 53.45, 59.1, 59.11, 59.12, 59.14

(56) References Cited

U.S. PATENT DOCUMENTS

| | | | | |
|---|---|---|---|---|
| 6,418,111 B1 | * | 7/2002 | Takemura et al. | 369/275.3 |
| 6,515,948 B1 | * | 2/2003 | Sakamoto | 369/47.32 |
| 6,560,181 B1 | * | 5/2003 | Takahashi | 369/53.35 |
| 6,564,338 B1 | * | 5/2003 | Sasaki et al. | 369/275.3 |

FOREIGN PATENT DOCUMENTS

JP        6-309802        11/1998

* cited by examiner

*Primary Examiner*—Muhammad Edun
(74) *Attorney, Agent, or Firm*—Staas & Halsey LLP

(57) ABSTRACT

An optical disc recording method to record data on a disc using multiple speeds by dividing a disc region into an inner circumference region and an outer circumference region depending on radii of the disc, setting a multiple recording speed for each region; setting optical recording power in a lead-in region of the inner circumference region and a lead-out region of the outer circumference region, by performing optimum power controls therein; determining in which one of the divided regions data is to be recorded using an address detected from the disc, rotating the disc at the multiple recording speed set for the one region in which the data is to be recorded, and recording the data in the one region using the set optical recording power for the one region.

16 Claims, 3 Drawing Sheets

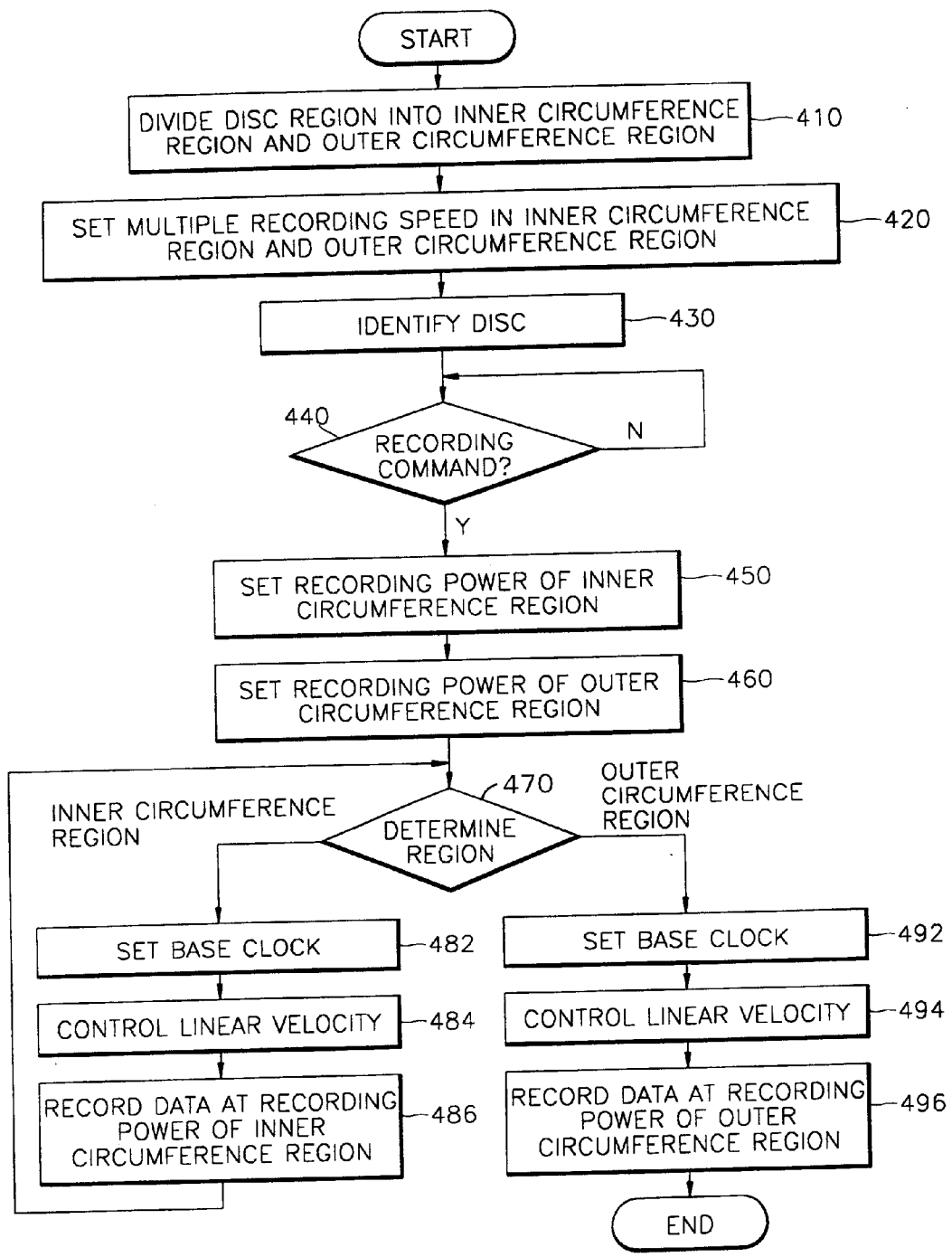

METHOD OF RECORDING DATA ON OPTICAL DISC AT HIGH MULTIPLE SPEED AND APPARATUS THEREOF

CROSS-REFERENCE TO RELATED APPLICATIONS

This application claims the benefit of Korean Application No. 2000-76491, filed Dec. 14, 2000, in the Korean Industrial Property Office, the disclosure of which is incorporated herein by reference.

BACKGROUND OF THE INVENTION

1. Field of the Invention

The present invention relates to an apparatus of recording data on and reproducing data from an optical disc, and more particularly, to a method of recording data on an optical disc at a high multiple speed and an apparatus thereof.

2. Description of the Related Art

Optical recording apparatuses which generally use high capacity recording media include a compact disc read/write (CD-R/W) driver and a digital versatile disc random access memory (DVD-RAM) driver. These optical recording apparatuses need optimal system states and higher precision as the recording density of data thereon increases.

FIG. 1 is a flowchart of a conventional method for recording data on an optical disc. First, a multiple recording speed is set by determining a recording clock time in operation 110, and a disc is loaded in operation 120. If a recording command from a host is received in operation 130, an optimum power value is found out in a power calibration area (PCA) region in an inner circumference of the disc and then a recording power is set to the optimum power value in operation 140.

A base clock which corresponds to the set speed is set in operation 150, and disc rotations are controlled by using a wobble signal in operation 160. At this time, the disc rotates at a constant linear velocity (CLV). That is, a microprocessor (not shown) controls the rotation of a spindle motor so that the linear velocity can be constant with respect to the radius of the disc. At this time, for example, in a CD-R/W disc, the rotation speed of the innermost circumference (23 mm radius) is 2.5 times faster than the outmost circumference (58 mm radius).

Then, data input from the host is recorded at the preset recording power in operation 170.

FIG. 2 is a graph showing disc rotation frequencies with respect to disc radii, by the recording method of FIG. 1 when the rotation speed is at a normal speed, 8 times faster speed, 16 times faster speed, 20 times faster speed, 24 times faster speed, and 32 times faster speed. Referring to FIG. 2, when the rotation speed is at a 24 times faster speed, the disc rotation frequency in the innermost circumference (22 mm radius) is higher than 188 Hz (11300 RPM).

Therefore, in the method of recording data on a disc, as shown in FIG. 1, since the number of rotations of the disc increases in the innermost circumference as the rotation speed increases by the CLV control, it is difficult to reduce recording time by increasing the disc rotation speed and satisfy a desired vibration characteristic or a desired pickup actuator characteristic. Therefore, as the rotation of the disc increases, the recording method of FIG. 1 needs a more sensitive actuator and a vibration prevention mechanism, which increases costs.

SUMMARY OF THE INVENTION

To solve the above problems, it is a first object of the present invention to provide a disc recording method which can reduce a recording time, by dividing a disc region into two regions depending on disc radii and then recording data on the disc at a different multiple recording speed for each region.

It is a second object to provide a disc recording apparatus configured and programmed to perform the disc recording method of the present invention.

Additional objects and advantages of the invention will be set forth in part in the description which follows and, in part, will be obvious from the description, or may be learned by practice of the invention.

To accomplish the above and other objects of the present invention, there is provided a high multiple speed optical disc recording method of dividing a disc region of the disc into an inner circumference region and an outer circumference region depending on radii of the disc, setting a multiple recording speed for each of the inner circumference and the outer circumference regions, setting optical recording power in a lead-in region of the inner circumference region and a lead-out region of the outer circumference region, by performing optimum power controls therein, determining in which one of the inner circumference region and the outer circumference region data is to be recorded, rotating the disc at the multiple recording speed set for the one region in which data is to be recorded, and recording the data in the one region using the set optical recording power for the one region. The disc regions is divided by specifying an address for each sector of the disc and a region in which the data is to be recorded is determined according to the address detected from the disc.

To accomplish the above and other objects of the present invention, there is provided a high multiple speed optical disc recording apparatus having a pickup unit recording data on a disc by focusing and tracking an optical signal, a microprocessor programmed to divide a disc region of the disc into an inner circumference region and an outer circumference region depending on radii of the disc, setting a multiple recording speed for each of the inner circumference and the outer circumference regions, setting optical recording power in a lead-in region of the inner circumference region and a lead-out region of the outer circumference region, by performing optimum power controls therein, providing clock times and optical recording powers to the pickup unit corresponding to the multiple recording speed set for each divided region when the data is recorded, and a signal processing unit encoding and modulating the data provided from a host, converting the modulated signal into an optical signal, and providing to the pickup unit the optical recording power input from the microprocessor.

BRIEF DESCRIPTION OF THE DRAWINGS

The above objects and advantages of the present invention will become more apparent by describing in detail preferred embodiments thereof with reference to the attached drawings in which:

FIG. 4 is a flowchart of a method recording data on an optical disc at high multiple speed according to the present invention.

DETAILED DESCRIPTION OF THE PREFERRED EMBODIMENTS

Figure 1:
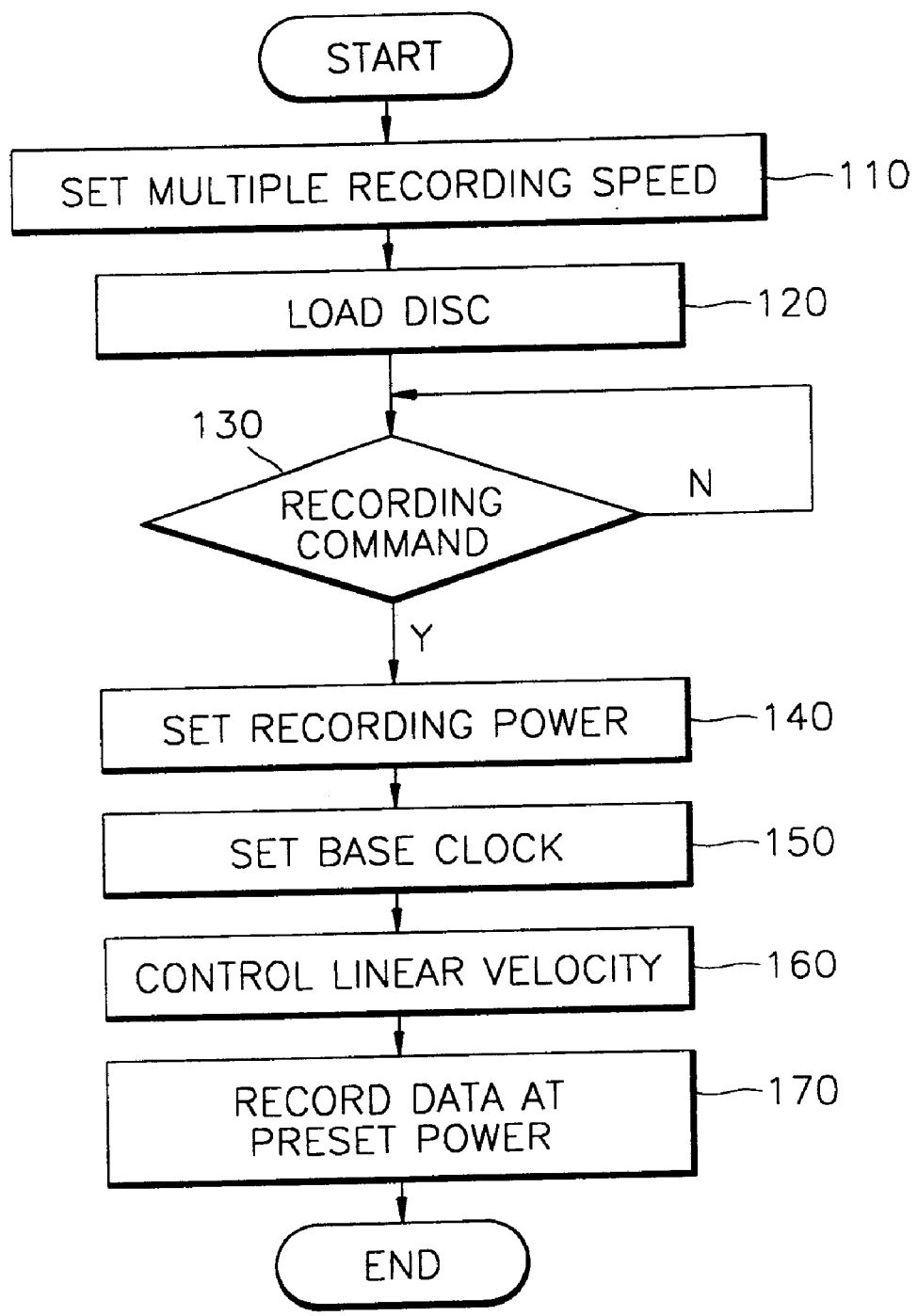
FIG. 1 is a flowchart of a conventional method for recording data on an optical disc.
Figure 2:
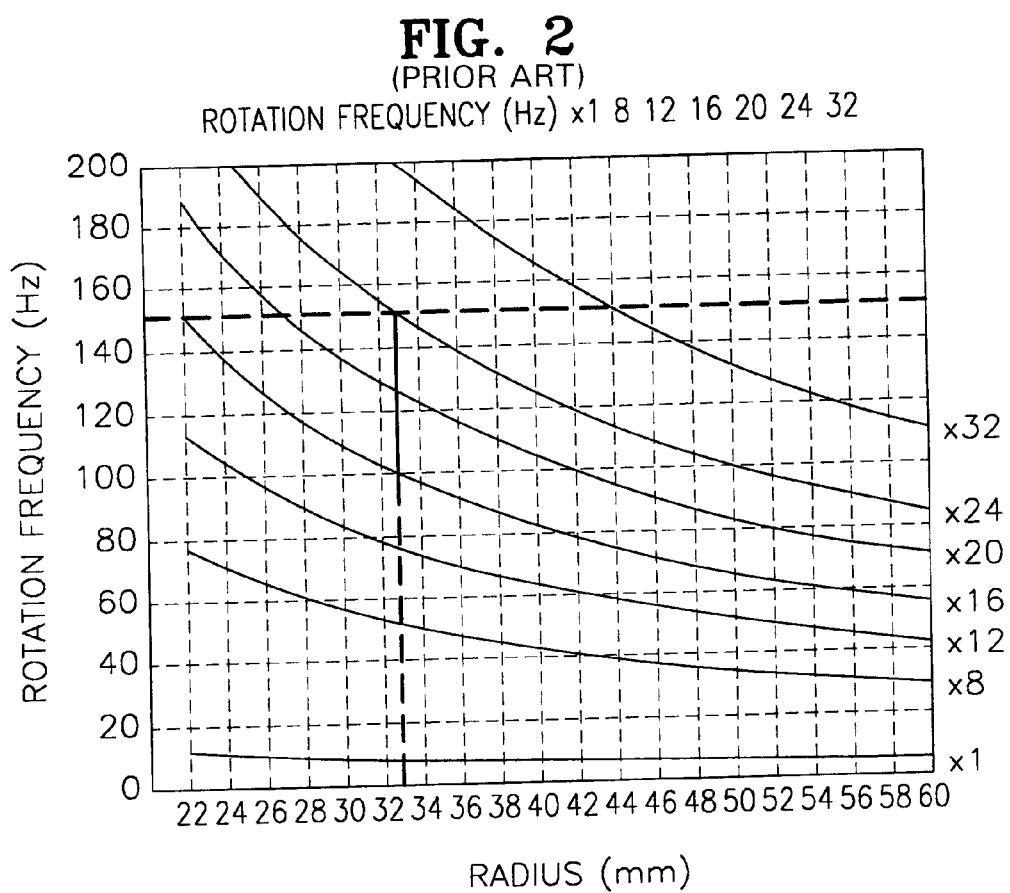
FIG. 2 is a graph showing disc rotation frequencies with respect to disc radii by the recording method of FIG. 1.

Hereinafter, embodiments of the present invention will be described in detail with reference to the attached drawings where like reference numerals refer to the like elements throughout. The embodiments are described below to explain the present invention by referring to the figures and to more completely explain the present invention to anyone skilled in the art. The present invention is not restricted to the following embodiments, and many variations are possible within the spirit and scope of the present invention, the scope of which is defined in the claims and their equivalents. The embodiments of the present invention are provided to more completely explain the present invention to anyone skilled in the art.

Figure 3:
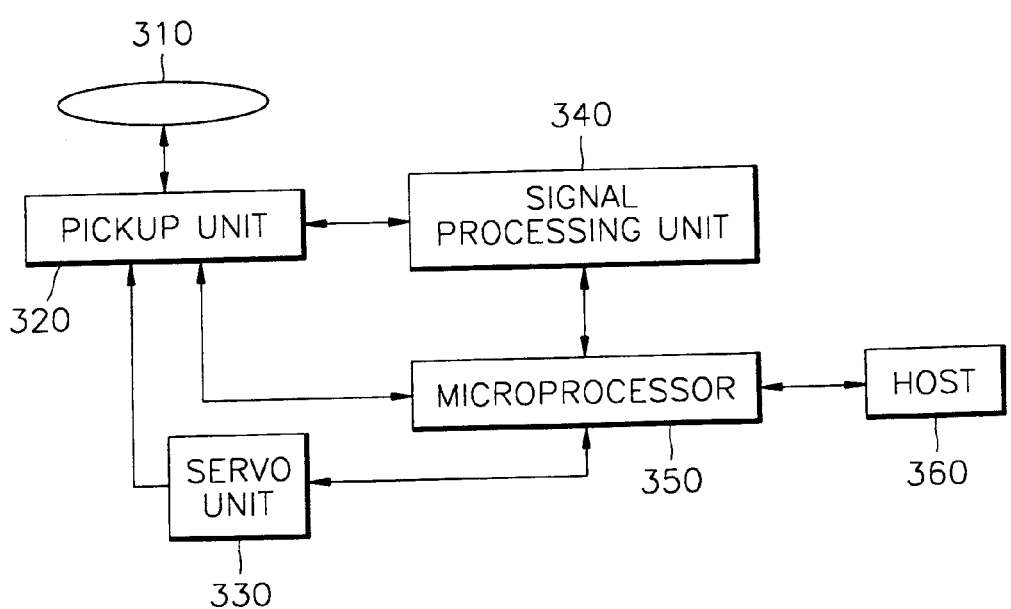
FIG. 3 is a block diagram of an apparatus recording data on an optical disc at a high multiple speed according to the present invention.

FIG. 3 is a block diagram of an apparatus recording data on an optical disc at a high multiple speed according to the present invention.

Referring to FIG. 3, a pickup unit 320 internally has a spindle motor that drives a recordable disc 310 and an actuator that focuses and tracks an optical signal to record the optical signal, which is input from a signal processing unit 340, to the disc 310.

The signal processing unit 340 internally has an RF amplifier (not shown). The signal processing unit 340 also encodes and modulates data, which is input from a host 360 through a microprocessor 350, converts the modulated signal into an optical signal, and provides recording power, which is input from the microprocessor 350, to the pickup unit 320. The signal processing unit 340 provides to a servo unit 330 a driving signal controlling the spindle motor and the actuator of the pickup unit 320. The servo unit 330 receives the driving signal needed for servo control, which is generated in the signal processing unit 340, through the microprocessor 350, and performs a stable servo function to control the pickup unit 320. Also, the signal processing unit 340 decodes/demodulates data recorded on the disc and detected by the pickup unit 320. That is, the signal processing unit 340 can detect an address value for determining a divided region of the disc.

The microprocessor 350 divides the disc 310 into regions with respect to disc radii in response to the commands from the host 360, and sets a rotation speed and optical recording power for each region. Then, the microprocessor 350 provides the set optical recording power to the signal processing unit 340 so that a laser output driving unit (not shown) internally installed in the pickup unit 320 can be controlled and at the same time each data block, which is input from the host 360, can be recorded on the disc 310.

FIG. 4 is a flowchart of a method recording data on the disc 310 at high multiple speed according to the present invention.

At operation 410, the microprocessor 350 divides the disc region into two regions, for example, an inner circumference region and an outer circumference region, between the innermost circumference and the outermost circumference on the basis of a 38 mm-radius disc, by specifying an address for each sector. At operation 420, the microprocessor 350 sets multiple recording speeds in the inner circumference region and the outer circumference region, respectively, using clock time stored in an internal memory (not shown).

Then, at operation 430 if the disc 310 is loaded, the microprocessor 350 checks whether the disc 310 is for recording or for reproducing, using information recorded in a read-in area.

If at operation 440 the disc is for recording, the microprocessor 350 waits for a recording command from the host 360.

If at operation 450 the microprocessor 350 receives a recording command from the host 360, the microprocessor 350 places the pickup on the inner circumference and sets an optimum recording power P1 so that an asymmetric signal, which is recorded through an optimum power control (OPC) process in a power calibration area (PCA), becomes a predetermined value. At this time, the PCA region is located inside of a lead-in region, and is a test region to find/determine an optimum recording power value. Then, at operation 460 the microprocessor 350 moves the pickup to the lead-out region of the outer circumference and sets an optimum recording power P2 so that an asymmetric signal, which is recorded through an OPC process in the outermost circumference portion (a portion which is not used), becomes a predetermined value.

Then, at operation 470 the microprocessor 350 determines whether the disc region in which data is to be recorded is the inner circumference region or the outer circumference region, using an address value detected from a light reflected from the disc (i.e., detected from the disc).

If at operation 470 the disc region in which data is to be recorded is the inner circumference region, at operation 482 the microprocessor 350 sets a base clock T1 to a predetermined clock time, controls the linear velocity (V1) according to T1 at operation 484, and at operation 486 records data at the predetermined power P1.

If at operation 470 the disc region in which data is to be recorded is the outer circumference region, at operation 492 the microprocessor 350 sets a base clock T2 to a predetermined clock time, controls the linear velocity (V2) according to T2 at operation 494, and at operation 496 records data at the predetermined power P2.

At this time, the linear velocity V1 set in the inner circumference region should be less than or equal to the linear velocity V2 set in the outer circumference region. Also, the clock time T1 set in the inner circumference region is equal to or greater than the clock time T2 set in the outer circumference. In addition, the recording power P1 set in the inner circumference region is less than or equal to the recording power P2 set in the outer circumference region.

Table 1 shows the recording time and the maximum number of rotations with respect to the speeds, in a CD-R/W drive for one disc and using conventional recording methods.

Referring to Table 1, in the CD-R/W drive, if the recording speed increases compared to a base speed (a normal speed), the recording time is reduced accordingly. For example, it takes about 72 minutes to record data at a normal speed, and about 3 minutes to record data at 24 times faster speed.

TABLE 1

| Recording speed | Recording time for a disc (minutes) | Maximum number of rotations (Hz) | Maximum number of rotations (RPM) |
| --- | --- | --- | --- |
| Normal speed | 72 | 9.4 | 564 |
| 8-fold | 9 | 75.2 | 4514 |
| 12-fold | 6 | 112.8 | 6771 |
| 16-fold | 4.5 | 150.4 | 9028 |
| 20-fold | 3.6 | 188.0 | 11286 |

TABLE 1-continued

| Recording speed | Recording time for a disc (minutes) | Maximum number of rotations (Hz) | Maximum number of rotations (RPM) |
|---|---|---|---|
| 24-fold | 3.0 | 225.7 | 13543 |
| 32-fold | 2.25 | 300.9 | 18057 |

However, according to the present invention, if data is recorded at a lower speed in the inner circumference region and at a higher speed in the outer circumference region after dividing the disc region into two regions with respect to disc radii, the recording time for one disc can be reduced without increasing the number of rotations. Therefore, dividing a disc region into regions depending on disc radii and setting a corresponding recording speed and a corresponding optical recording power for each region, reduces the recording time and the required disc rotations corresponding to the reduced recording time if using the typical method of only increasing recording speed to reduce recording time.

Table 2 shows the recording time and the maximum number of rotations with respect to the speeds, in a CD-R/W drive for one disc and using a recording method according to the present invention.

Referring to Table 2, according to the present invention, in a 33 mm-radius disc, if the disc region is divided into two regions, and data is recorded at a 16 times faster speed in the inner circumference region and at a 24 times faster speed in the outer circumference region, the total recording time is about 3 minutes. Therefore, the number of spindle motor rotations can be lowered at the maximum frequency (Hz) or rotation number (RPM).

TABLE 2

| Multiple recording speed according to the present invention | Recording time for a disc (minutes) | Maximum number of rotations (Hz) | Maximum number of rotations (RPM) |
|---|---|---|---|
| 16-fold recording speed in inner circumference region and 24-fold recording speed in outer circumference region, in a 33 mm-radius disc. | 3.31 | 150.4 | 9028 |

The present invention is not restricted to the above-described embodiments, and many variations are possible within the spirit and scope of the present invention. A CD-R/W may be one example of the optical disc recording apparatus according to the present invention, but the present invention can be applied to all optical discs, such as a DVD-RAM.

As described above, because the present invention can record data at different rotation speeds depending on disc regions, the recording time for one disc can be reduced compared to CLV recording while the maximum transmission rate (bits per second) is the same as the CLV recording at the same rotation speed. Also, compared to the CLV recording, it is easier to control timing and power strength. Also by reducing the number of motor rotations, the structure of an actuator becomes simpler and the heat and vibration of a spindle motor can be reduced.

Although a preferred embodiment of the present invention has been shown and described, it would be appreciated by those skilled in the art that changes may be made in this embodiment without departing from the principles and spirit of the invention. The scope of the present invention is defined in the claims and the claims' equivalents.

What is claimed is:

1. A high multiple speed optical disc recording method for a disc, comprising:
    dividing a disc region of the disc into an inner circumference region and an outer circumference region depending on radii of the disc;
    setting a multiple recording speed for each of the inner circumference and the outer circumference regions;
    setting optical recording power in a lead-in region of the inner circumference region and a lead-out region of the outer circumference region, by performing optimum power controls therein;
    determining in which one of the inner circumference region and the outer circumference region data is to be recorded, from an address value detected from the disc;
    rotating the disc at the multiple recording speed set for the one region in which the data is to be recorded; and
    recording data in the one region using the set optical recording power for the one region.

2. The high multiple speed optical disc recording method of claim 1, wherein the inner circumference region and the outer circumference region are regions from an innermost circumference region and an outermost circumference region depending on the radii of the disc.

3. The high multiple speed optical disc recording method of claim 1, wherein the setting of a linear velocity (V1) of the inner circumference region is less than or equal to the setting of a linear velocity (V2) of the outer circumference region.

4. The high multiple speed optical disc recording method of claim 1, wherein a power P1 used in recording the data in the inner circumference region is less than or equal to a power P2 used in recording the data in the outer circumference region.

5. The high multiple speed optical disc recording method of claim 1, wherein the setting of the optical recording power in the lead-in region of the inner circumference region comprises performing optical power control in a power calibration area (PCA) of the lead-in region, and the setting of the optical recording power in the lead-out region of the outer circumference region comprises performing optical power control in the lead-out region.

6. The high multiple speed optical disc recording method of claim 1, wherein the lead-out region of the outer circumference is an outermost circumference portion of the disc.

7. A high multiple speed optical disc recording apparatus for a disc, comprising:
    a pickup unit recording data on the disc by focusing and tracking an optical signal;
    a microprocessor programmed to divide a disc region of the disc into an inner circumference region and an outer circumference region depending on radii of the disc, to set a multiple recording speed for each of the inner circumference and the outer circumference regions, to set optical recording power in a lead-in region of the inner circumference region and a lead-out region of the outer circumference region, by performing optimum power controls therein, and to provide clock times and optical recording powers to the pickup unit corresponding to the multiple recording speed set for each divided region when the data is recorded; and
    a signal processing unit encoding and modulating the data provided from a host, converting the modulated signal into an optical signal, and providing to the pickup unit the optical recording powers input from the microprocessor.

8. An optical disc recording method for a disc, comprising:
dividing a disc region of the disc into an inner circumference region and an outer circumference region depending on radii of the disc;
setting a corresponding recording speed and a corresponding optical recording power for the inner circumference region and the outer circumference region, respectively; and
recording data in the divided inner circumference and outer circumference regions using the corresponding recording speed and optical recording power provided for each divided inner circumference and outer circumference region.

9. An optical disc recording method for a disc, comprising:
dividing a disc region into an inner circumference region and an outer circumference region depending on radii of the disc;
setting a recording speed for the divided inner circumference and outer circumference regions depending on location of each divided inner circumference and outer circumference region from an innermost circumference region or an outermost circumference region of the disc;
determining an optical recording power for the divided inner circumference and outer circumference regions depending on location of each divided inner circumference and outer circumference region from an innermost circumference region or an outermost circumference region of the disc; and
recording data in the divided inner circumference and outer circumference regions using the recording speed and the optical recording power for each divided region, respectively.

10. The method according to claim 9, wherein the dividing comprises specifying an address for each sector of the disc, and the address, when detected from the disc, is used to determine in which one of the divided inner circumference and the outer circumference regions the data is to be recorded.

11. The optical disc recording method according claim 10, wherein the setting of a linear velocity (V1) of the inner circumference region is less than or equal to the setting of a linear velocity (V2) of the outer circumference region and a power P1 used in recording the data in the inner circumference region is less than or equal to a power P2 used in recording the data in the outer circumference region.

12. The optical disc recording method according to claim 9, wherein the setting of a linear velocity (V1) of the inner circumference region is less than or equal to the setting of a linear velocity (V2) of the outer circumference region and a power P1 used in recording the data in the inner circumference region is less than or equal to a power P2 used in recording the data in the outer circumference region.

13. The optical disc recording method according to claim 9, wherein the disc is a CD-R/W or a DVD-RAM.

14. An optical disc recording apparatus for a disc, comprising:
a processor programmed to divide a disc region into an inner circumference region and an outer circumference region depending on radii of the disc, to set a recording speed for each divided inner circumference and outer circumference region depending on location of each region from an innermost circumference region of the disc or an outermost circumference region, to determine an optical recording power for each divided inner circumference and outer circumference region depending on location of the region from an innermost circumference region or an outermost circumference region of the disc; and
a pickup unit in communication with the processor and receiving from the processor for each inner circumference and outer circumference region the set recording speed and the set optical recording power and recording data in the divided inner circumference and outer circumference regions using the received recording speed for each inner circumference and outer circumference region and optical recording power for each inner circumference and outer circumference region.

15. The optical disc recording apparatus according to claim 14, wherein the setting of a linear velocity (V1) of the inner circumference region is less than or equal to the setting of a linear velocity (V2) of the outer circumference region and a power P1 used in recording data in the inner circumference region is less than or equal to a power P2 used in recording data in the outer circumference region.

16. The optical disc recording apparatus according to claim 15, wherein the disc is a CD-R/W or a DVD-RAM.

* * * * *